US008867781B2

(12) United States Patent
Pan et al.

(10) Patent No.: US 8,867,781 B2
(45) Date of Patent: *Oct. 21, 2014

(54) TWO LEVEL CROSS-CORRELATION BASED SYSTEM FOR WATERMARKING CONTINUOUS DIGITAL MEDIA

(75) Inventors: Shien-Tai Pan, Laguna Niguel, CA (US); Bing Wang, Aliso Viejo, CA (US); Hoai Le, Huntington Beach, CA (US); Yi Li, Foothill Ranch, CA (US); Victor Kai-Chieh Liang, Irvine, CA (US); Maurice Chow, Irvine, CA (US); Richard Thai, Fountain Valley, CA (US)

(73) Assignee: Lawrence N. Ginsberg, Newport Beach, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/460,379

(22) Filed: Apr. 30, 2012

(65) Prior Publication Data
US 2012/0213401 A1 Aug. 23, 2012

Related U.S. Application Data

(63) Continuation of application No. 12/775,886, filed on May 7, 2010, now Pat. No. 8,175,328, which is a continuation of application No. 11/262,006, filed on Oct. 28, 2005, now Pat. No. 7,715,588.

(51) Int. Cl.
| G06K 9/00 | (2006.01) |
| G06T 1/00 | (2006.01) |
| H04N 19/48 | (2014.01) |
| H04N 19/467 | (2014.01) |
| H04N 19/42 | (2014.01) |

(52) U.S. Cl.
CPC ... *H04N 19/00478* (2013.01); *H04N 19/00563* (2013.01); *H04N 19/00557* (2013.01)
USPC ............................ 382/100; 382/278; 380/200

(58) Field of Classification Search
USPC ............ 382/100, 278; 380/200, 201; 713/176
See application file for complete search history.

(56) References Cited

U.S. PATENT DOCUMENTS

| 6,760,463 | B2 * | 7/2004 | Rhoads .......................... 382/100 |
| 7,707,422 | B2 | 4/2010 | Shin |

(Continued)

OTHER PUBLICATIONS

"Encryption and Watermarking for the Secure Distribution of Copyrighted MPEG Video on DVD", Multimedia Systems 9: PP217-227, 2003, Simitopoulos et al.

(Continued)

*Primary Examiner* — Jon Chang
(74) *Attorney, Agent, or Firm* — Lawrence N. Ginsberg (57) ABSTRACT

A two level cross-correlation based system for watermarking continuous digital media at the system application level. It is a post-compression process for watermarking where no a priori knowledge of the underlying compression algorithm is required. Per each compressed media frame, a current unique digital signature is generated based on the data from the current compressed frame plus the digital signature that has been previously generated. The signature thus generated is then used in conjunction with the next compressed frame to generate the next unique digital signature. All digital signatures are correlated according to the above process until a "reset" signal is issued. A new chain of correlated digital signatures is produced by the system with a predetermined initial signature.

16 Claims, 7 Drawing Sheets

(56) References Cited

U.S. PATENT DOCUMENTS

| | | |
|---|---|---|
| 2005/0050332 A1 | 3/2005 | Serret-Avila |
| 2007/0047442 A1 | 3/2007 | Snyder |
| 2010/0040255 A1 | 2/2010 | Rhoads |

OTHER PUBLICATIONS

"Hardware Implementation Perspectives of Digital Video Watermarking Algorithms" IEEE Transaction on Digital Signal Processing, vol. 51, No. 4, Apr. 2003, Mathai et al.

"An Entropy Masking Model for Multimedia Content Watermarking", Proceedings of the 37$^{th}$ Hawaii International Conference on System Sciences, 2004, Kim et al.

"Multiresolution Watermarking for Images and Video", IEEE Transaction on Circuits and Systems for Video Technology, vol. 9, No. 4, Jun. 1999, Zhu et al.

"Digital Watermarking for DVD Video Copy Protection", IEEE Signal Processing Magazine, Sep. 2000, Maes et al.

Hayes, John P., Computer Architecture and Organization, McGraw-Hill, 1998, p. 87.

* cited by examiner

FIG. 1

Example of Two Level Cross-Correlation Operation

FIG. 2

FIG. 3A
Initial Step – Frame #0

FIG. 3B
Transition from Frame #0 to Frame #1

FIG. 3C
Transition from Frame #1 to Frame #2

FIG. 3D
Transition from Frame #2 to Frame #3

FIG. 3E
Transition from Frame #3 to Frame #4

FIG. 3F
Transition from Frame #4 to Frame #5

FIG. 3G
Transition from Frame #5 to Frame #6

FIG. 3H
Transition from Frame #6 to Frame #7

FIG. 3I
Transition from Frame #7 to Frame #8

TWO LEVEL CROSS-CORRELATION BASED SYSTEM FOR WATERMARKING CONTINUOUS DIGITAL MEDIA

CROSS REFERENCE TO RELATED APPLICATIONS

This is a continuation of U.S. Ser. No. 12/775,886, now U.S. Pat. No. 8,175,328, entitled "Two Level Cross-Correlation Based System for Watermarking Continuous Digital Media" filed May 7, 2010 which is a continuation of U.S. Ser. No. 11/262,006, entitled "Two Level Cross-Correlation Based System for Watermarking Continuous Digital Media" filed Oct. 28, 2005, now U.S. Pat. No. 7,715,588. This invention is related to U.S. Ser. No. 11/260,906, entitled "Correlation-Based System for Watermarking Continuous Digital Media", filed Oct. 28, 2005, now U.S. Pat. No. 7,715,587, by co-applicants, Pan et al, and assigned to the present assignee and is also related to the co-filed patent application, U.S. Ser. No. 12/775,845. U.S. Ser. No. 11/260,906, now U.S. Pat. No. 7,715,587, and U.S. Ser. No. 12/775,845 are incorporated by reference herein in their entireties.

BACKGROUND OF THE INVENTION

1. Field of the Invention

The present invention relates to multimedia authentication and more particularly to a two level cross-correlation based system for watermarking continuous digital media. The primary area for the application of the present invention is the content authentication and ownership identification for continuous digital media that are prone to active attacks such as unauthorized removal and unauthorized embedding. Furthermore, to protect the watermarks from being easily tampered or detected by unauthorized personnel, a method of "two level cross-correlation" is thus introduced while watermarks are being created.

2. Description of the Related Art

Watermarking has been widely used for the applications of multimedia authentication and copyright protection. Video watermarking, in particular, is unique to other types of media watermarking in that it deals primarily with real-time continuous bitstreams. Many prior art references have focused on watermarking at the video compression level. See for example, D. Simitopoulos, N. Zissis, P. Georgiadis, V. Emmanouilidis, and M. G. Strintzis, "*Encryption and watermarking for the secure distribution of copyrighted MPEG video on DVD,*" Multimedia Systems 9: pp 217-227, 2003; N. J. Mathai, D. Kundur, and A. Sheikholeslami, "*Hardware Implementation Perspectives of Digital Video Watermarking Algorithms,*" IEEE Transactions on Digital Signal Processing, Vol. 51, No. 4, April 2003; S. W. Kim and S. Suthaharan, "*An Entropy Masking Model for Multimedia Content Watermarking,*" Proceedings of the 37th Hawaii International Conference on System Sciences, 2004; W. Zhu, Z. Xiong, and Y. Q. Zhang, "*Multiresolution Watermarking for Images and Video,*" IEEE Transactions on Circuits and Systems for Video Technology, Vol. 9, No. 4, June 1999; M. Maes, T. Kalker, J-P. Linnartz, J. Talstra, G. Depovere, and J. Haitsma, "*Digital Watermarking for DVD Video Copy Protection,*" IEEE Sigmal Processing Magazine, September 2000. Although these methods generally produce good protection by taking into consideration the information contents of the underlying video, they tend to consume extra processing power that can otherwise be used to improve the performance of the encoder and/or reduce the latencies caused by time-critical tasks.

As will be disclosed below, the present invention provides for an efficient implementation of video watermarking at the system level and yet produces good protection and authentication on the recorded videos.

SUMMARY OF THE INVENTION

In a broad aspect, the present invention is a two level cross-correlation based system for watermarking continuous digital media. The two level cross-correlation based system includes an application control module (ACM) including a graphical user interface (GUI), for i) logically AND'ing a predetermined frame correlation vector (FCV) and a predetermined frame mask vector (FMV) to generate a frame switch vector (FSV) that provides controls to an external frame switching means; and, ii) logically AND'ing a predetermined signature correlation vector (SCV) and a predetermined signature mask vector (SMV) to generate a signature switch vector (SSV) that provides controls to an external signature switching means. The ACM also provides: i) an enable/disable control signal in response to a command by the user via the GUI; and, ii) a reset signal. A media encoder receives uncompressed media data from a media source and provides compressed media frames (F). A file system captures the compressed media data from the media encoder. A software retrieval module (SRM) retrieves the compressed media frames ($F_j$) from the file system. A first signature buffer buffers a previously generated signature ($S_{j-1}$). A second signature buffer is operatively connected to the first signature buffer for buffering a currently generated unique digital signature ($S_j$), wherein a transition from the second signature buffer to the first signature buffer occurs when a transition takes place from one frame to the next. A third signature buffer stores a predefined initial signature ($S_0$). A 2:1 multiplexer (MUX) receives an input from the first signature buffer ($S_{j-1}$), and another input from the third signature buffer ($S_0$). The reset signal from the ACM is a select control input signal to the 2:1 MUX, wherein one of the two inputs ($S_{j-1}$) and ($S_0$) is selected as the output from the 2:1 MUX depending on the logic value of the reset signal. A frame switching means is operatively connected to the SRM and the FSV of the ACM for controlling the flow of the compressed frames $F_j$ from the SRM. A signature switching means is operatively connected to the 2:1 MUX and the SSV of the ACM for controlling the flow of the output from the 2:1 MUX. A signature generator is operatively connected to the frame switching means, to the signature switching means, and to the ACM, for generating a unique digital signature ($S_j$) based on i) the $F_j$, if the frame switching means is "on", ii) the output from said 2:1 MUX, if the signature switching means is "on", and iii) the status of said enable/disable control signal. The signature generator provides the $S_j$ to the second signature buffer if the enable/disable control signal is set to "enable". The signature generator provides no signature if the enable/disable control signal is set to "disable". If both of the frame switching means and the signature switching means are "off", then a "null signature" is generated and the null signature is provided to the second signature buffer if the enable/disable control signal is set to "enable". The signature generator provides no signature if the enable/disable control signal is set to "disable". An encryptor receives the unique digital signature ($S_j$) and encrypts the unique digital signature if the enable/disable control signal is set to "enable" and then stores the encrypted unique digital signature ($E_j$) to the file system. The signature generator provides no signature to the encryptor if the enable/disable control signal is set to "disable".

Use of the present invention has several advantages over the prior art. (1) The present watermarking method applies to continuous digital media data such as video or audio rather than still images. (2) The method can be applied directly to the compressed media data. Therefore, the amount of data to be processed is tremendously reduced. (3) No knowledge of the underlying media compression algorithm is required in the present method; hence the computational complexity is greatly reduced. This is contrary to many prior art systems where the watermarking techniques are built on top of the compression algorithms. (4) The present method applies directly to the compressed media frames with variable lengths rather than to the uncompressed frames with a common fixed length. This increases the difficulty of tampering without being detected. (5) A unique digital signature is to be generated per each frame based on the input data from the current compressed frame and the previous signature. No specific digital signature generation algorithm is preferred, i.e., any digital signature generation process can be employed. The signature thus generated is "correlated" with the previous frame via the previously generated signature. Furthermore, the "correlation" is crossly created via a two level control process in which the frame and the signature involved in the current signature generation process are determined through a frame correlation vector and a signature correlation vector, respectively. This makes the piracy of the original media contents extremely difficult and the detection of the piracy very easy to implement, for if any frame has been modified, all the signatures corresponding to that frame and beyond will be wrong. (6) All the digital signatures are "correlatively" generated based on the predefined frame and signature correlation vectors until it is instructed to "reset" to the initial signature or change the correlations defined in the frame and the signature correlation vectors to begin a new correlated signature generation process. The control of the "reset" and the change of the two correlation vectors further create the dynamics to the pattern of the signatures being generated, which makes the media content even more difficult from being tampered with. (7) The overall watermarking operation of the present invention can be easily implemented at the Application level, which requires very minimum system resource and therefore can be easily integrated with the entire system. (8) A fast "False Detection" program can be easily written to detect and identify which frame or frames have been tampered without the need of decoding the entire media content—a tremendous saving in time can be achieved.

The watermarking technique of the present invention is commonly applied to digital media such as video and audio. However, the same method is applicable to any digital media that are continuous in nature.

DETAILED DESCRIPTION OF THE INVENTION

Figure 1:
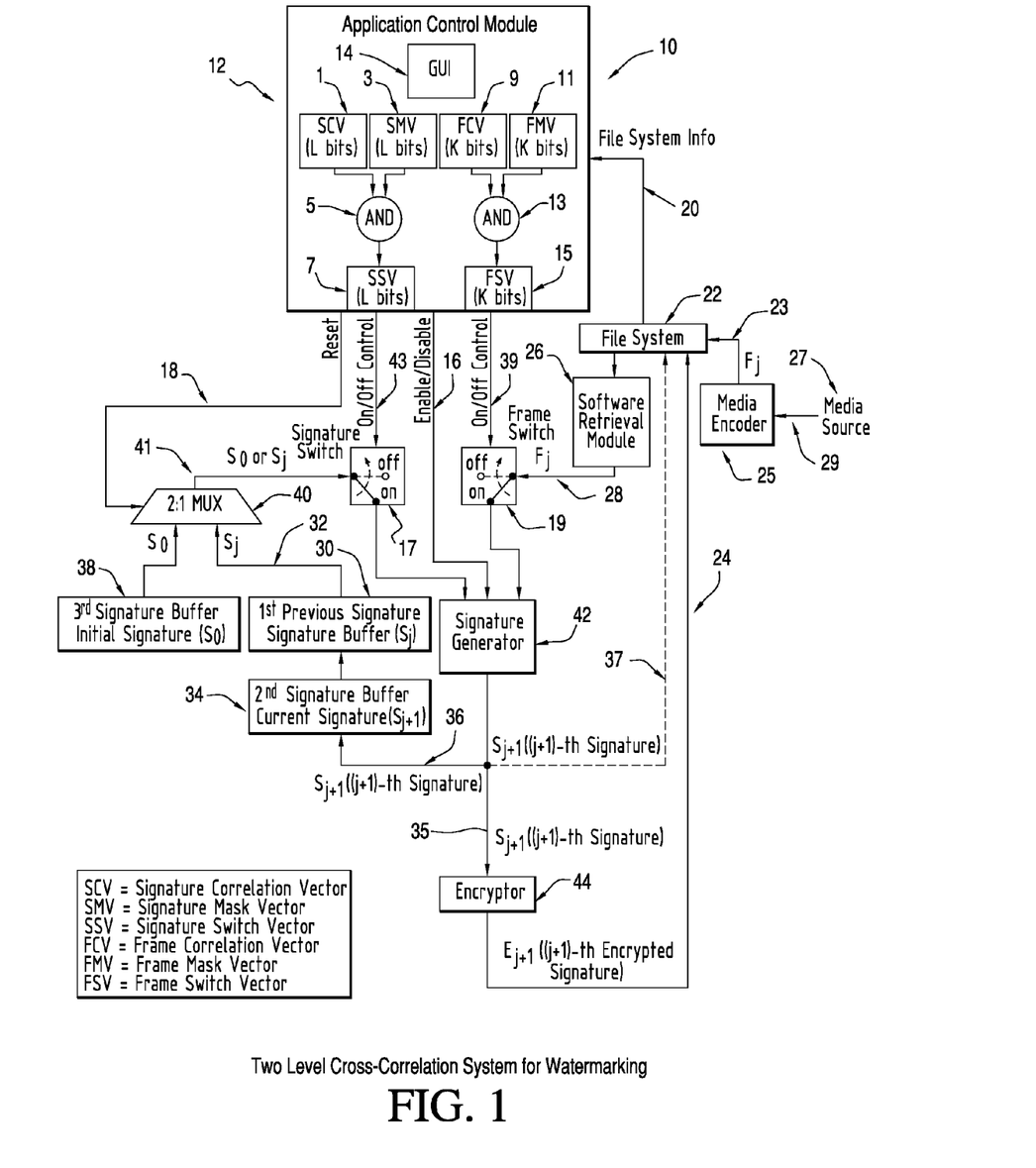
FIG. 1 is a flow diagram illustrating the two level cross-correlation based system for watermarking continuous digital media of the present invention.

Referring now to the drawings and the characters of reference marked thereon, FIG. 1 illustrates a preferred embodiment of the two level cross-correlation based system for watermarking continuous digital media of the present invention, designated generally as 10. This two level cross-correlation based system 10 includes an application control module (ACM) 12 that includes a graphical user interface (GUI) 14, a frame correlation vector (FCV) 9 of length K (K bits, labeled from 0 to K−1), a frame mask vector (FMV) 11 of length K, a logical AND operator 13, a frame switch vector (FSV) 15 of length K, a signature correlation vector (SCV) 1 of length L (L bits, labeled from 0 to L−1), a signature mask vector (SMV) 3 of length L, a logical AND operator 5, and a signature switch vector (SSV) 7 of length L. The FCV 9 defines a correlation, or a selection criterion, among frames. For example, the j-th compressed Frame $F_j$ will be selected if FCV[k]=1, where j=k mod K. $F_j$ will be de-selected if FCV[k]=0. The FMV 11 defines a frame mask which, when logically ANDed with FCV 9 via the AND operator 13, provides a binary decision stored in the FSV 15 that determines whether a frame will eventually be selected to join the current signature generation process. For example, $F_j$ will be selected to participate in the j-th signature generation process for the digital signature $S_{j+1}$ if FSV[k]=1, where j=k mod K. $F_j$ will be skipped if FSV[k]=0. Likewise, The SCV 1 defines a correlation, or a selection criterion, among signatures. For example, the j-th signature $S_j$ will be selected if SCV[n]=1, where j=n mod L. $S_j$ will be de-selected if SCV[n]=0. The SMV 3 defines a signature mask which, when logically ANDed with SCV 1 via the AND operator 5, provides a binary decision stored in the SSV 7 that determines whether a signature will eventually be selected to join the current signature generation process. For example, $S_j$ will be selected to participate in the j-th signature generation process for the digital signature $S_{j+1}$ if SSV[n]=1, where n=j mod L. $S_j$ will skipped if SSV[k]=0. The ACM provides the serially On/Off control outputs 39 from FSV 15 rotationally (starting from bit number 0) and the serially On/Off control outputs 43 from SSV 7 rotationally (starting from bit number 0). The ACM 12 also provides an enable/disable control signal 16 and a reset signal 18 in response to a command by the user via the GUI 14 and file system information 20, respectively. The ACM 12 may be embodied as part of application software which allows users to provide control and configuration to a typical stationary Digital Video Recording (DVR) system or completely embedded control software in a mobile DVR system which is generally installed and operated in a mobile vehicle such as a police car or a bus.

A file system 22 captures compressed continuous media data 23 from the Media Encoder (ME) 25. The compressed continuous media data is generally embodied in forms of media frames ($F_j$). The ME 25 receives the uncompressed media data 29 from a media source such as a camera 27. The uncompressed media data 29 may be audio/video data, solely video data or solely audio data. Furthermore, it may be in analog form or digital form. If it is in analog form the media encoder 25 typically provides a conversion from analog to digital. Similarly, the compressed media data may be audio/video data, solely video data or solely audio data.

A software retrieval module (SRM) 26 retrieves the compressed media frames ($F_j$) from the file system 22, as indicated by numeral designation 28. To retrieve the frames, the SRM 26 must first perform a "File Open" function call to the File System 22 to obtain a File Pointer which points to the location of the file containing the header associated with the compressed media data. The SRM 26 then reads the length of the compressed media frame $F_j$ based on this File Pointer and calculates the Frame Pointer pointing to the location of the frame $F_j$ in the file system 22. The SRM 26 is now ready to fetch the frame data $F_j$ based on the calculated Frame Pointer. Although the SRM 26 described above is shown as a stand alone software module in FIG. 1, it is not necessarily to be included as a dedicated software module in the entire system. For example, depending on the implementation, the same functions described above for the SRM 26 can be embedded as an integral part of other software modules.

A first Signature Buffer 30 buffers the previously generated signature ($S_j$). A second Signature Buffer 34 buffers the currently generated unique digital signature ($S_{j+1}$). Thus a signature transition $S_{j+1} \rightarrow S_j$ takes place from the second Signature Buffer 34 to the first Signature Buffer 30 when a transition takes place from frame ($F_{j-1}$) to frame ($F_j$).

A third Signature Buffer 38 stores a predefined initial signature ($S_0$). Both of the signature ($S_0$) in the third Buffer 38 and the signature ($S_j$) in the first Buffer 30 are the two inputs to a 2:1 multiplexer (MUX) 40. One and only one of these inputs will be selected as the output 41 of the MUX 40 determined by the logic level of the reset signal 18 from the ACM 12. If the reset signal 18 is set to HIGH (=1), the initial signature ($S_0$) in the third Buffer will be selected as the output 41 of the MUX 40. If the reset signal 18 is reset to LOW (=0), the previously generated signature ($S_j$) in the first Buffer 30 will be selected as the output 41 of the MUX 40. The logic level of the reset signal 18 is normally set to HIGH at the beginning of the entire operation and dropped down to LOW immediately after the very first signature is generated and retained at the LOW level for the rest of the operation so that the previously generated signature ($S_j$) can always be the output of the MUX 40. Depending on the implementation, the reset signal 18 can be set to HIGH as many times as desired during the course of the operation.

A frame switching means 19 is operatively connected to the SRM 26 and the FSV 15 of ACM 12 for controlling the flow of frames ($F_j$) from the SRM 26. If the control signal 39 from FSV 15 is a binary "1", the frame switching means 19 will be turned "ON" and let the frame ($F_j$) flow through. If the control signal 39 from FSV 15 is a binary "0", the frame switching means 19 will be turned "OFF" and the frame ($F_j$) from the SRM 26 will be discarded and no data will be flown through the frame switching means 19.

A signature switching means 17 is operatively connected to the 2:1 MUX 40 and the SSV 7 of ACM 12 for controlling the flow of signatures ($S_j$) from the 2:1 MUX 40. If the control signal 43 from SSV 7 is a binary "1", the signature switching means 17 will be turned "ON" and let the signature ($S_j$) flow through. If the control signal 43 from SSV 7 is a binary "0", the signature switching means 17 will be turned "OFF" and the signature ($S_j$) from the 2:1 MUX 40 will be discarded and no data will be flown through the signature switching means 17.

A signal generator 42 is operatively connected to the frame switching means 19, the signature switching means 17, and to the ACM 12, for generating a current unique digital signature ($S_{j+1}$) based on: i) the current compressed frame $F_j$, if the frame switching means 19 is "ON"; ii) the output from the 2:1 MUX 40 (either the initial signature $S_0$ or the previously generated digital signature $S_j$ depending on whether the reset signal 18 is "Set" or "Reset"), if the signature switching means is "ON"; and iii) the status of the enable/disable control signal 16. If the enable/disable control signal 16 is set to Enable by the ACM 12, the signature generator 42 will operate normally. However, if the enable/disable control signal 16 is set to Disable by the ACM 12, the signature generator 42 will be shut down and no signature will be generated, thus no watermark will be created. If both of the frame switching means 19 and the signature switching means 17 are "OFF" while the enable/disable control signal 16 is Enabled, a "null signature" will be generated by the signal generator 42. The setting of the enable/disable control signal 16 is normally done through a static configuration at the beginning of a recording session. However, a dynamic "re-configuration" of the enable/disable control signal 16 is possible (while a recording session is in progress), providing the new settings are properly kept by the system. The signature generator 42 provides the current signature $S_{j+1}$ 36 to the second signature buffer 34 if the enable/disable control signal 16 is set to Enable. For a production level implementation, any signature generation algorithm, such as the Cyclic Redundancy Code (CRC), can be used in the signature generator 42.

An encryptor 44 receives the unique digital signature ($S_{j+1}$) 35 and encrypts the unique digital signature if the enable/disable control signal 16 is set to Enable. Any suitable reversible encryption algorithm (e.g., 64/128-bit AES/DES) can be employed in the encryptor 44. The encrypted unique digital signature ($E_{j+1}$) 24 is stored in the file system 22. Although (for security reasons) the encryptor 44 is a preferred implementation, it may not constitute a critical element of the present invention. Therefore its implementation may be optionally eliminated. If this is the case, then the unique digital signature ($S_{j+1}$) 37 generated by the signature generator 42 will be stored to the file system 22 directly.

Figure 2:
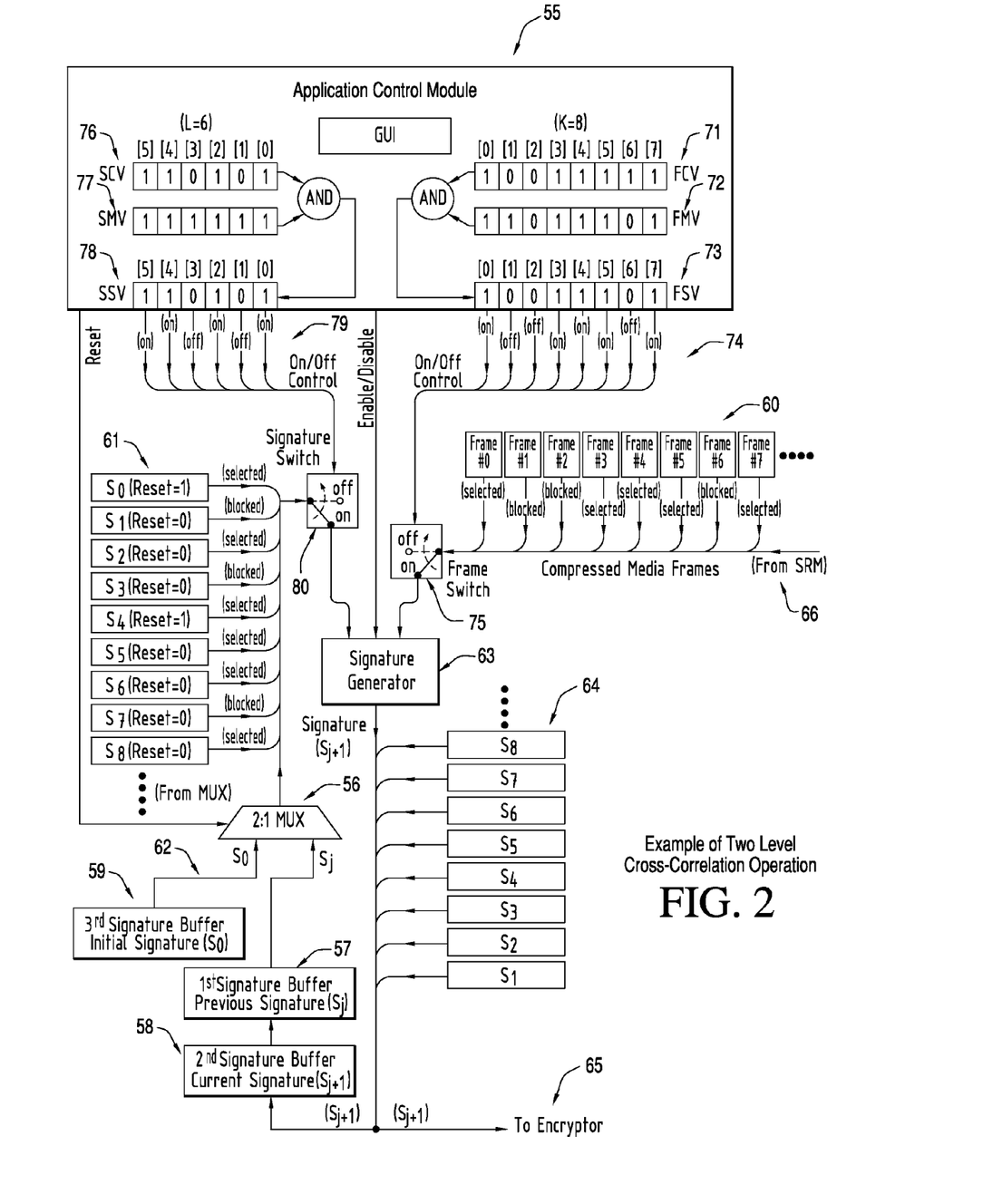
FIG. 2 is a flow diagram illustrating an example of the operation of the present invention.

Referring now to FIG. 2 and FIGS. 3A-3I, FIG. 2 shows an example during the operation of the present system, designated generally as 55; and, FIGS. 3A-3I illustrate the FIG. 2 example with step-by-step details, designated generally as 100, 200, 300, 400, 500, 500, 600, 700, 800, and 900, respectively. As depicted in FIG. 2, the length of FCV 71 is 8 (K=8). FCV 71 is loaded with FCV[7:0]=B'11111001' and FMV 72 is loaded with FMV[7:0]=B'10111011'. Both FCV 71 and FMV 72 are ANDed together and the result is stored in FSV 73, i.e., FSV[7:0]=B'10111001'. FSV 73 is outputted serially 74 to the frame switching means 75. A "1" indicates that the frame switching means 75 will be turned "ON", whereas a "0" indicates that the frame switching means 75 will be turned "OFF". The frame switching means 75 controls the flow of the compressed frames 60 from the SRM 66. A frame will be "selected" as an input to the signature generator 63 if the frame switching means 75 is on. It will be "blocked" (i.e., discarded) if the frame switching means 75 is off. As also depicted in FIG. 2, the length of SCV 76 is 6 (L=6). SCV 76 is loaded with SCV[7:0]=B'110101' and SMV 77 is loaded with SMV[7:0]=B'111111'. Both SCV 76 and SMV 77 are ANDed together and the result is stored in SSV 78, i.e., SSV[5:0]=B'110101'. SSV 78 is outputted serially 79 to the signature switching means 80. A "1" indicates that the signature switching means 80 will be turned "ON", whereas a "0" indicates that the signature switching means 80 will be turned "OFF". The signature switching means 80 controls the flow of the signatures 61 outputted from the 2:1 MUX 56. A signature will be "selected" as an input to the signature generator 63 if the signature switching means 80 is on. It will be "blocked" (i.e., discarded) if the signature switching means 80 is off. An initial signature $S_0$ 62 will be preloaded to the third signature buffer 59 by the application. The generated signatures 64 from the signature generator 63 will be sent to the encryptor, as shown by numeral designation 65, as well as stored in the second signature buffer 58.

Figure 3A:
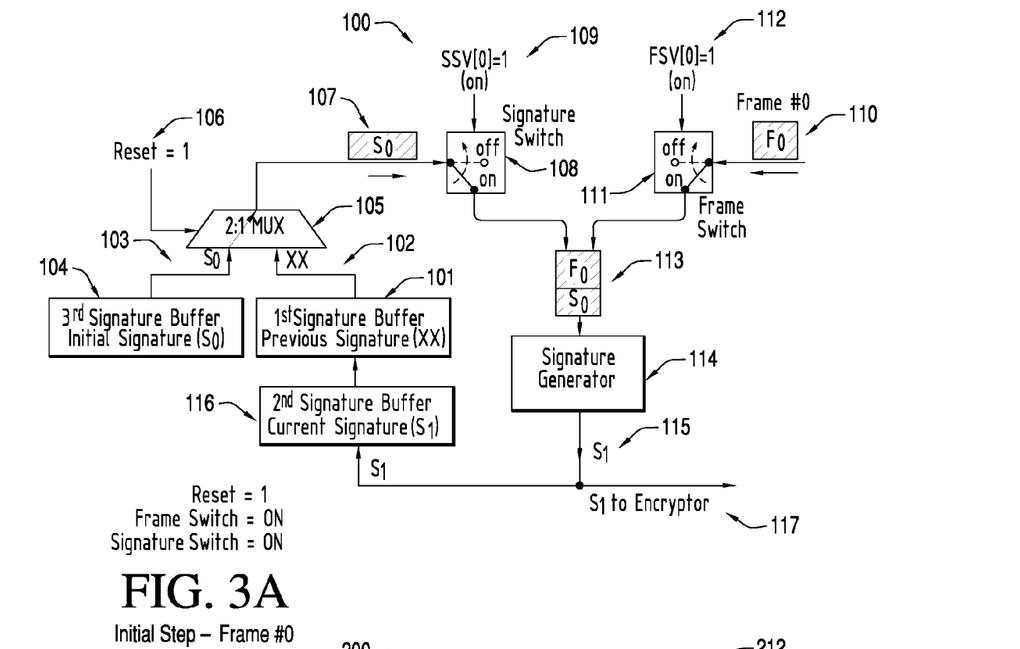
FIGS. 3A-3I illustrate the FIG. 2 example with step-by-step details.

Referring now to FIG. 3A, in an initial step, designated generally as 100, before the entire operation starts, the first signature buffer 101, which is used to store the previously generated signature, will contain some value XX 102 (which is irrelevant to the operation). At the very beginning of the process, both $S_0$ 103 in the third buffer 104 and XX 102 in the first buffer 101 are the inputs to the 2:1 multiplexer 105. The reset signal 106 is set to HIGH (binary 1) initially by the application. This setting will select the initial signature $S_0$ 107 as the output from the multiplexer 105 and as the input to the signature switching means 108. Since SSV[0]=B"1" 109, the signature switching means 108 will be turned on and the signature $S_0$ 107 will be selected and outputted from the signature switching means 108. The current frame $F_0$ 110, on the other hand, is inputted to the frame switching means 111. Since FSV[0]=B'1' 112, the frame switching means 111 will be turned on and the frame $F_0$ 110 will be selected and outputted from the frame switching means 111. Both outputs $S_0$ 107 and $F_0$ 110 will then be concatenated together to form a new frame $S_0\|F_0$ 113, which in turn will be the input to the signature generator 114. The first signature $S_1$ 115 will then be generated and outputted from the signature generator 114 to the second signature buffer 116 as well as the encryptor 117.

Figure 3B:
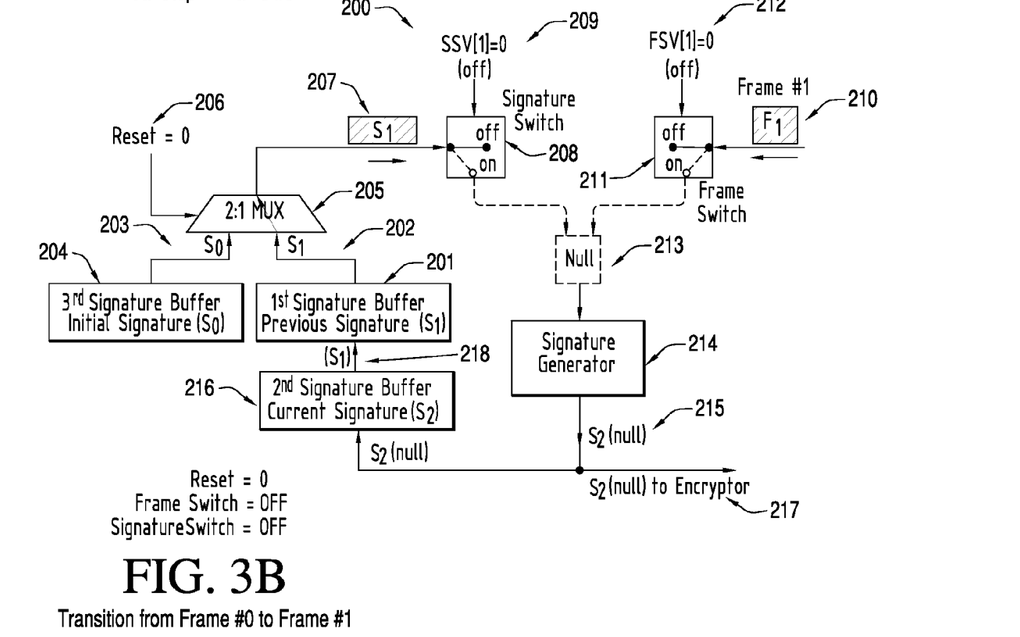

Referring now to FIG. 3B, in a transition step designated generally as 200, as soon as the generation of the signature $S_1$ is completed, as shown in FIG. 3A, the process transitions from the frame #0 to frame #1. During this transition, the signature $S_1$ 218 residing previously in the second signature buffer 216 will be stored to the first signature buffer 201. Both of the signatures $S_0$ 203 in the third buffer 204 and $S_1$ 202 in the first buffer 201 are the inputs to the 2:1 multiplexer 205. The reset signal 206 is set to LOW (binary 0) by the application. This setting will select the signature $S_1$ 207 as the output from the multiplexer 205 and as the input to the signature switching means 208. Since SSV[1]=B"0" 209, the signature switching means 208 will be turned off and the signature $S_1$ 207 will be blocked (discarded) by the signature switching means 208. The current frame $F_1$ 210, on the other hand, is inputted to the frame switching means 211. Since FSV[1]=B'0' 212, the frame switching means 211 will be turned off and the frame $F_1$ 210 will be blocked (discarded) by the frame switching means 211. Since both $S_1$ 207 and $F_1$ 210 are discarded, a "null" frame 213 (i.e., no data) will be the input to the signature generator 214. The second signature $S_2$ (null signature) 215 will then be generated and outputted from the signature generator 214 to the second signature buffer 216 as well as the encryptor 217.

Figure 3C:
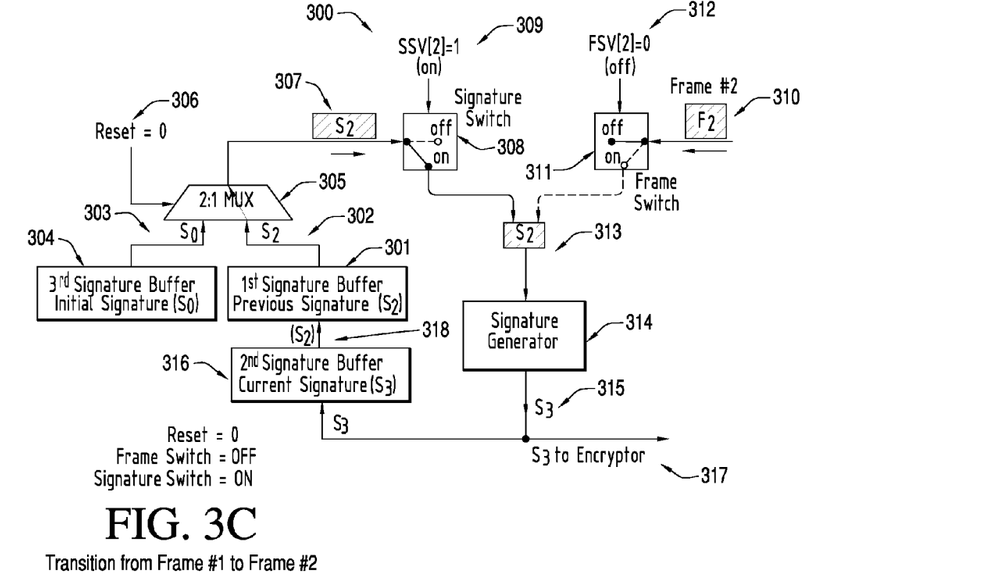

Referring now to FIG. 3C, in a transition step designated generally as 300, as soon as the generation of the signature $S_2$ is completed, as shown in FIG. 3B, the process transitions from the frame #1 to frame #2. During this transition, the signature $S_2$ 318 residing previously in the second signature buffer 316 will be stored to the first signature buffer 301. Both of the signatures $S_0$ 303 in the third buffer 304 and $S_2$ 302 in the first buffer 301 are the inputs to the 2:1 multiplexer 305. The reset signal 306 is retained at LOW (binary 0) by the application. This setting will select the signature $S_2$ 307 as the output from the multiplexer 305 and as the input to the signature switching means 308. Since SSV[2]=B"1" 309, the signature switching means 308 will be turned on and the signature $S_2$ 307 will be selected and outputted from the signature switching means 308. The current frame $F_2$ 310, on the other hand, is inputted to the frame switching means 311. Since FSV[2]=B'0' 312, the frame switching means 311 will be turned off and the frame $F_2$ 310 will be blocked (discarded) by the frame switching means 311. Since $F_2$ 310 is discarded, only $S_2$ 307 will be the input 313 to the signature generator 314. The third signature $S_3$ 315 will then be generated and outputted from the signature generator 314 to the second signature buffer 316 as well as the encryptor 317.

Figure 3D:
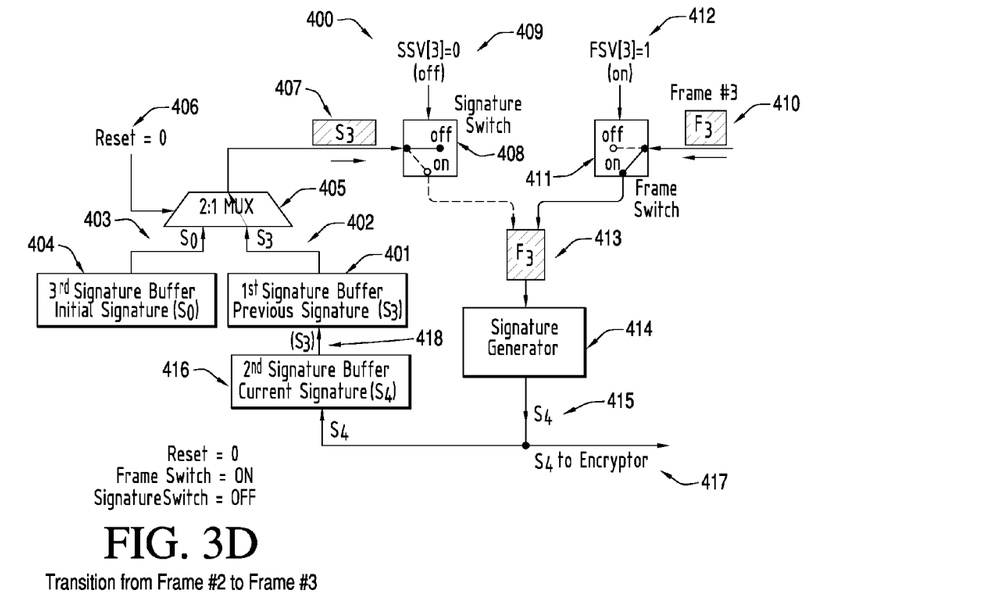

Referring now to FIG. 3D, in a transition step designated generally as 400, as soon as the generation of the signature $S_3$ is completed, as shown in FIG. 3C, the process transitions from the frame #2 to frame #3. During this transition, the signature $S_3$ 418 residing previously in the second signature buffer 416 will be stored to the first signature buffer 401. Both of the signatures $S_0$ 403 in the third buffer 404 and $S_3$ 402 in the first buffer 401 are the inputs to the 2:1 multiplexer 405. The reset signal 406 is retained at LOW (binary 0) by the application. This setting will select the signature $S_3$ 407 as the output from the multiplexer 405 and as the input to the signature switching means 408. Since SSV[3]=B"0" 409, the signature switching means 408 will be turned off and the signature $S_3$ 407 will be blocked (discarded) by the signature switching means 408. The current frame $F_3$ 410, on the other hand, is inputted to the frame switching means 411. Since FSV[3]=B'1' 412, the frame switching means 411 will be turned on and the frame $F_3$ 410 will be selected and outputted from the frame switching means 411. Since $S_3$ 407 is discarded, only $F_3$ 410 will be the input 413 to the signature generator 414. The forth signature $S_4$ 415 will then be generated and outputted from the signature generator 414 to the second signature buffer 416 as well as the encryptor 417.

Figure 3E:
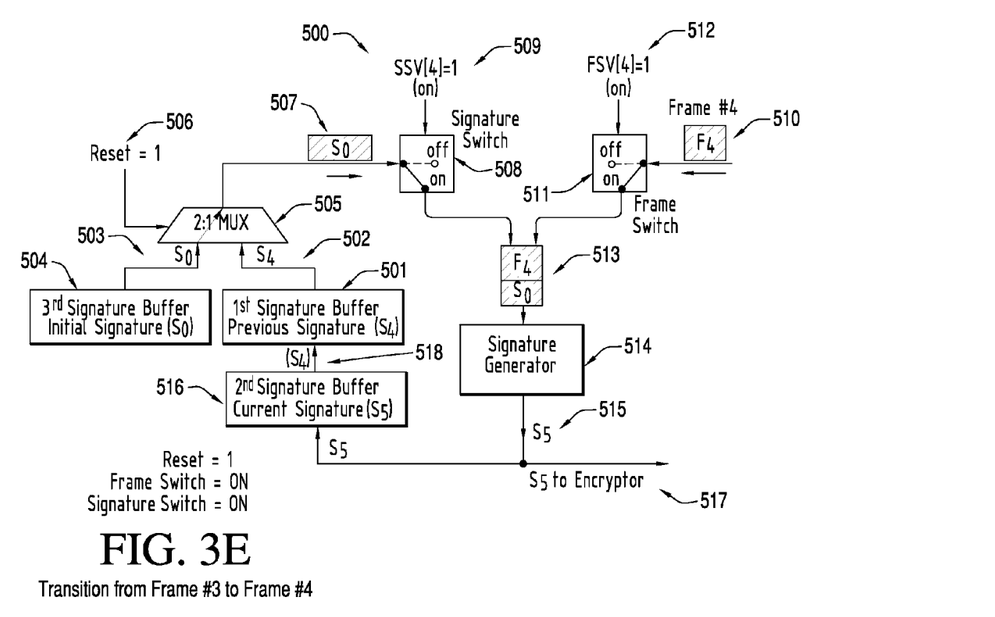

Referring now to FIG. 3E, in a transition step designated generally as 500, as soon as the generation of the signature $S_4$ is completed, as shown in FIG. 3D, the process transitions from the frame #3 to frame #4. During this transition, the signature $S_4$ 518 residing previously in the second signature buffer 516 will be stored to the first signature buffer 501. Both of the signatures $S_0$ 503 in the third buffer 504 and $S_4$ 502 in the first buffer 501 are the inputs to the 2:1 multiplexer 505. The reset signal 506 is set to HIGH (binary 1) by the application. This setting will select the signature $S_0$ 507 as the output from the multiplexer 505 and as the input to the signature switching means 508. Since SSV[4]=B"1" 509, the signature switching means 508 will be turned on and the signature $S_0$ 507 will be selected and outputted from the signature switching means 508. The current frame $F_4$ 510, on the other hand, is inputted to the frame switching means 511. Since FSV[4]=B1' 512, the frame switching means 511 will be turned on and the frame $F_4$ 510 will be selected and outputted from the frame switching means 511. Both outputs $S_0$ 507 and $F_4$ 510 will then be concatenated together to form a new frame $S_0\|F_4$ 513, which in turn will be the input to the signature generator 514. The fifth signature $S_5$ 515 will then be generated and outputted from the signature generator 514 to the second signature buffer 516 as well as the encryptor 517.

Figure 3F:
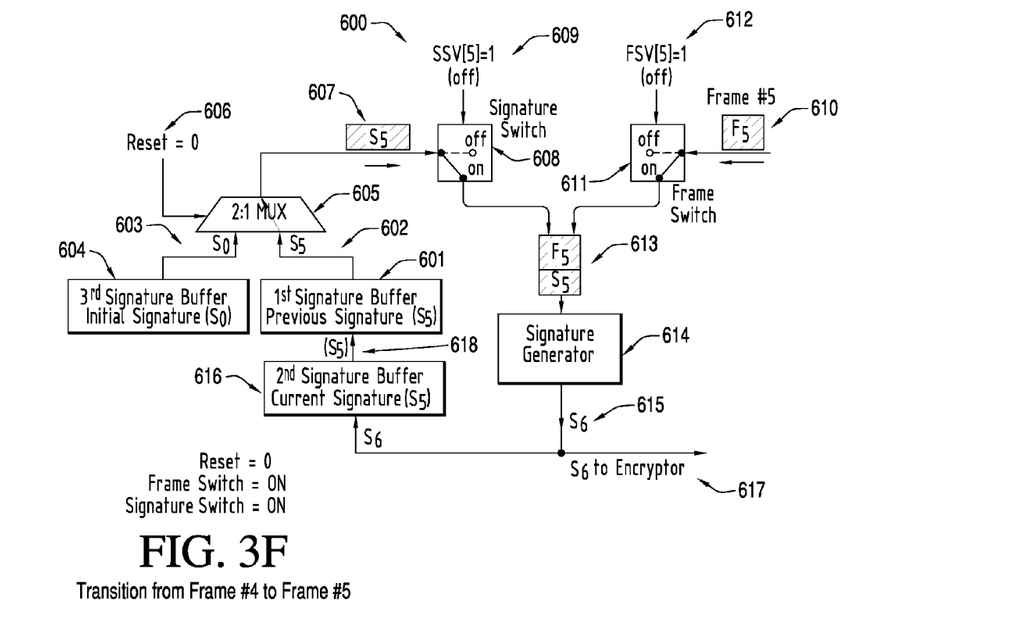

Referring now to FIG. 3F, in a transition step designated generally as 600, as soon as the generation of the signature $S_5$ is completed, as shown in FIG. 3E, the process transitions from the frame #4 to frame #5. During this transition, the signature $S_5$ 618 residing previously in the second signature buffer 616 will be stored to the first signature buffer 601. Both of the signatures $S_0$ 603 in the third buffer 604 and $S_5$ 602 in the first buffer 601 are the inputs to the 2:1 multiplexer 605. The reset signal 606 is reset to LOW (binary 0) by the application. This setting will select the signature $S_5$ 607 as the output from the multiplexer 605 and as the input to the signature switching means 608. Since SSV[5]=B"1" 609, the signature switching means 608 will be turned on and the signature $S_5$ 607 will be selected and outputted from the signature switching means 608. The current frame $F_5$ 610, on the other hand, is inputted to the frame switching means 611. Since FSV[5]=B1' 612, the frame switching means 611 will be turned on and the frame $F_5$ 610 will be selected and outputted from the frame switching means 611. Both outputs $S_5$ 607 and $F_5$ 610 will then be concatenated together to form a new frame $S_5\|F_5$ 613, which in turn will be the input to the signature generator 614. The sixth signature $S_6$ 615 will then be generated and outputted from the signature generator 614 to the second signature buffer 616 as well as the encryptor 617.

Figure 3G:
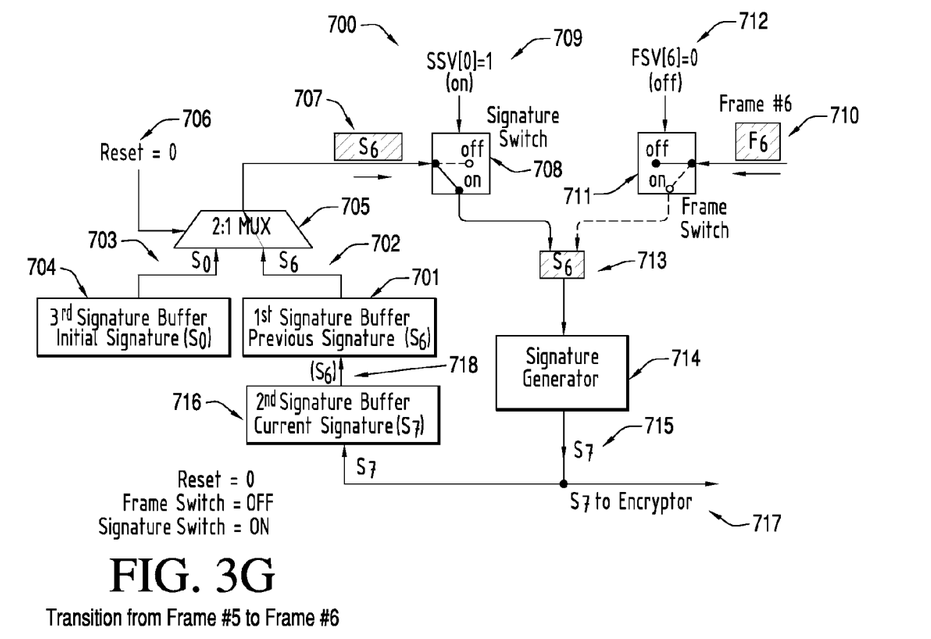

Referring now to FIG. 3G, in a transition step designated generally as 700, as soon as the generation of the signature $S_6$ is completed, as shown in FIG. 3F, the process transitions from the frame #5 to frame #6. During this transition, the signature $S_6$ 718 residing previously in the second signature buffer 716 will be stored to the first signature buffer 701. Both of the signatures $S_0$ 703 in the third buffer 704 and $S_6$ 702 in the first buffer 701 are the inputs to the 2:1 multiplexer 705. The reset signal 706 is retained at LOW (binary 0) by the application. This setting will select the signature $S_6$ 707 as the output from the multiplexer 705 and as the input to the signature switching means 708. Since SSV[0]=B"1" 709 (note: since the length of SSV is 6, the switch control output from SSV is rapped around and returns back to bit #0, i.e., SSV[0] will be in effect for the current iteration), the signature switching means 708 will be turned on and the signature $S_6$ 707 will be selected and outputted from the signature switching means 708. The current frame $F_6$ 710, on the other hand, is inputted to the frame switching means 711. Since FSV[6]=B'0' 712, the frame switching means 711 will be turned off and the frame $F_6$ 710 will be blocked (discarded) by the frame switching means 711. Since $F_6$ 710 is discarded, only $S_6$ 707 will be the input 713 to the signature generator 714. The seventh signature $S_7$ 715 will then be generated and outputted from the signature generator 714 to the second signature buffer 716 as well as the encryptor 717.

Figure 3H:
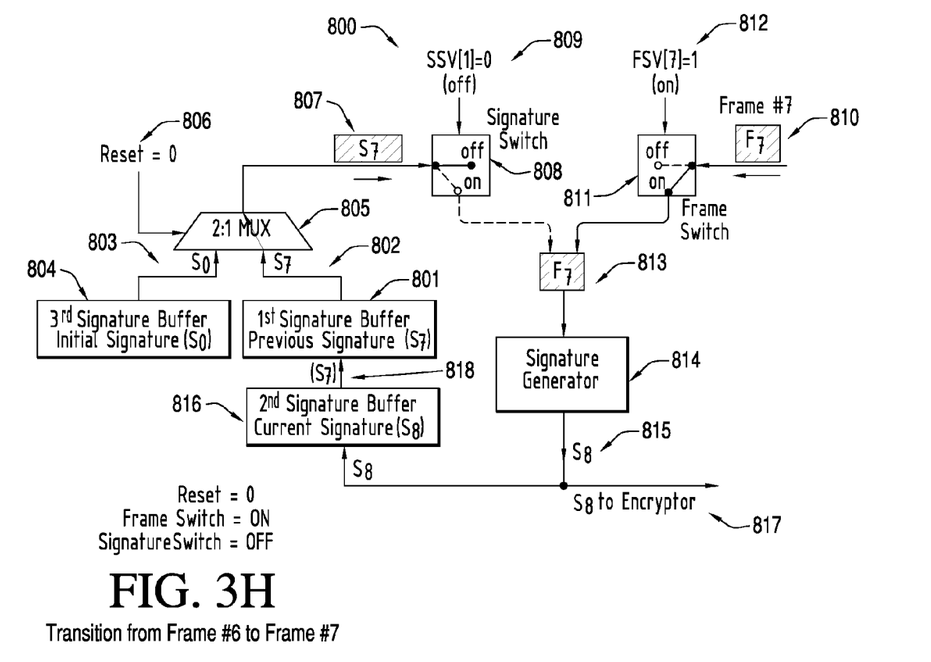

Referring now to FIG. 3H, in a transition step designated generally as 800, as soon as the generation of the signature $S_7$ is completed, as shown in FIG. 3G, the process transitions from the frame #6 to frame #7. During this transition, the signature $S_7$ 818 residing previously in the second signature buffer 816 will be stored to the first signature buffer 801. Both of the signatures $S_0$ 803 in the third buffer 804 and $S_7$ 802 in the first buffer 801 are the inputs to the 2:1 multiplexer 805. The reset signal 806 is retained at LOW (binary 0) by the application. This setting will select the signature $S_7$ 807 as the output from the multiplexer 805 and as the input to the signature switching means 808. Since SSV[1]=B"0" 809, the signature switching means 808 will be turned off and the signature $S_7$ 807 will be blocked (discarded) by the signature switching means 808. The current frame $F_7$ 810, on the other hand, is inputted to the frame switching means 811. Since FSV[7]=B'1' 812, the frame switching means 811 will be turned on and the frame $F_7$ 810 will be selected and outputted from the frame switching means 811. Since $S_7$ 807 is discarded, only $F_7$ 810 will be the input 813 to the signature generator 814. The eighth signature $S_8$ 815 will then be generated and outputted from the signature generator 814 to the second signature buffer 816 as well as the encryptor 817.

Figure 3I:
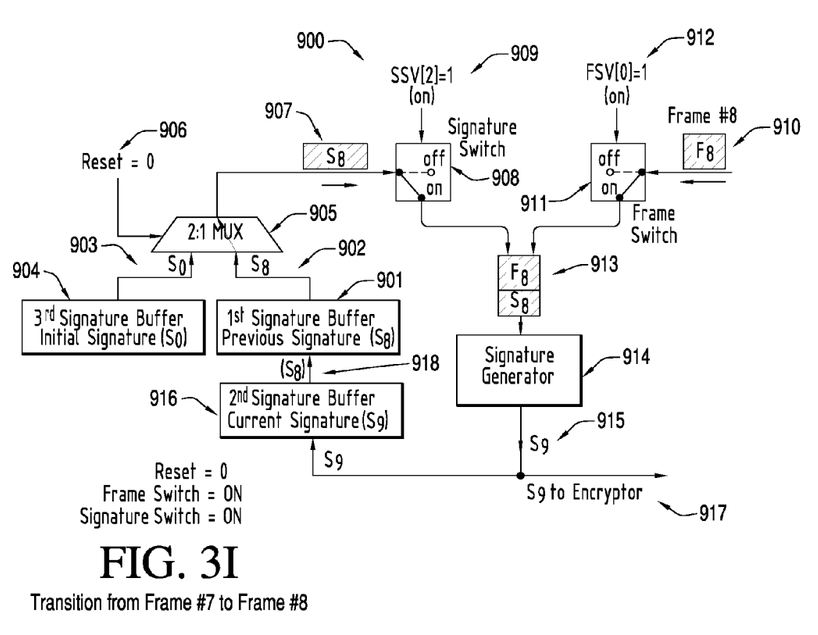

Referring now to FIG. 3I, in a transition step designated generally as 900, as soon as the generation of the signature $S_8$ is completed, as shown in FIG. 3H, the process transitions from the frame #7 to frame #8. During this transition, the signature $S_8$ 918 residing previously in the second signature buffer 916 will be stored to the first signature buffer 901. Both of the signatures $S_0$ 903 in the third buffer 904 and $S_8$ 902 in the first buffer 901 are the inputs to the 2:1 multiplexer 905. The reset signal 906 is retained at LOW (binary 0) by the application. This setting will select the signature $S_8$ 907 as the output from the multiplexer 905 and as the input to the signature switching means 908. Since SSV[2]=B"1" 909, the signature switching means 908 will be turned on and the signature $S_8$ 907 will be selected and outputted from the signature switching means 908. The current frame $F_8$ 910, on the other hand, is inputted to the frame switching means 911. Since FSV[0]=B1' 912 (note: since the length of FSV is 8, the switch control output from FSV is rapped around and returns back to bit #0, i.e., FSV[0] will be in effect for the current iteration), the frame switching means 911 will be turned on and the frame $F_8$ 910 will be selected and outputted from the frame switching means 911. Both outputs $S_8$ 907 and $F_8$ 910 will then be concatenated together to form a new frame $S_8 \| F_8$ 913, which in turn will be the input to the signature generator 914. The ninth signature $S_9$ 915 will then be generated and outputted from the signature generator 914 to the second signature buffer 916 as well as the encryptor 917.

Generally speaking, the above process will generate a current unique digital signature $S_{j+1}$ based on the current compressed frame $F_j$, if the frame switching means is on, and the previously generated digital signature $S_j$, if the signature switching means is on. The current unique digital signature $S_{j+1}$ thus generated will then be used in conjunction with the next compressed frame $F_{j+1}$ to generate the next unique digital signature $S_{j+2}$. This process continues over and over again till the entire process is terminated or the Enable/Disable signal 16 in system 10 is changed to "Disable" by the application.

Although the system of the present invention has been described as having the file system information 20 being provided to the ACM 12 and the ACM 12 providing the reset signal 18 in response to the file system information there are other potential implementations. For example, the reset signal 18 can be set by the ACM 12 per every N frames, where N is an arbitrary positive integer, or set by the ACM 12 whenever a new recording session begins. In general, the reset signal 18 can be set by the ACM 12 in a "random" fashion which is known only to the implementation. Likewise, the values in SCV 1, SMV 3, FCV 9, and FMV 11 in system 10 can all be changed in a "random" fashion which is known only to the implementation. The advantage of controlling the time to set the reset signal 18 and to change the values in SCV 1, SMV 3, FCV 9, and FMV 11 in 10 in a random fashion is that it creates "dynamics" to the signature generation process that is hardly reproduced at the time the media content is ever tampered.

As noted above, a fast "False Detection" program can be easily written to detect and identify which frame or frames have been tampered without the need of decoding the entire media content. The writing of such a program can be accomplished by one skilled in the art. For example, if a user's interest is only to detect if the media content has ever been tampered, a program can be written to re-generate the unique digital signature per each compressed media frame according to the method described in 10. The identical settings of the reset control signal 18, SCV 1, SMV 3, FCV 9, FMV 11, and the enable/disable control signal 16 in 10 which are used to generate the original watermarks will now be used by this program. Since no decompression of the media is needed in this case, the detection program can be implemented very fast. The re-generated signatures will then be compared with the original signatures which are already stored in the file system 22. If the original signatures were encrypted, they need to be decrypted before the comparison can take place. A "False" is detected if a miss-compare occurs. The False Detection program can also be implemented while the decompression of the media is in progress (i.e., the media is being played back). However in this case, the detection program can only show the detection of the temporal occurrences of tampered frames at the speed of the playback.

Other embodiments and configurations may be devised without departing from the spirit of the invention and the scope of the appended claims.

The invention claimed is:

1. A two level cross-correlation based system for watermarking continuous digital media, comprising:
   a) an application control module (ACM) for:
      i. logically AND'ing a predetermined frame correlation vector (FCV) and a predetermined frame mask vector (FMV) to generate a frame switch vector (FSV), said frame switch vector (FSV) for providing controls to a frame switching means; and,
      ii. logically AND'ing a predetermined signature correlation vector (SCV) and a predetermined signature mask vector (SMV) to generate a signature switch vector (SSV), said signature switch vector (SSV) for providing controls to a signature switching means; and
      said ACM including a graphical user interface (GUI), said ACM for providing: i) an enable/disable control signal in response to a command by the user via the GUI; and, ii) a reset signal;
   b) a media encoder for receiving uncompressed media data from a media source and providing compressed media frames ($F_j$);
   c) a software retrieval module (SRM) for retrieving said compressed media frames ($F_j$);
   d) a first signature buffer for buffering a previously generated signature ($S_{j-1}$);
   e) a second signature buffer operatively connected to said first signature buffer for buffering a currently generated unique digital signature ($S_j$), wherein a transition from said second signature buffer to said first signature buffer occurs when a transition takes place from one frame to the next;
   f) a third signature buffer for storing a predefined initial signature ($S_0$);
   g) a 2:1 multiplexer (MUX) for receiving an input from said first signature buffer ($S_{j-1}$), and another input from said third signature buffer ($S_0$), said reset signal from said ACM being a select control input signal to said 2:1 MUX, wherein one of the two inputs ($S_{j-1}$) and ($S_0$) are selected as the output from said 2:1 MUX depending on the logic value of said reset signal;
   h) frame switching means operatively connected to said SRM and to said FSV for controlling the flow of said $F_j$ from said SRM;
   i) signature switching means operatively connected to said 2:1 MUX and to said SSV for controlling the flow of said output from said 2:1 MUX;
   j) a signature generator operatively connected to said frame switching means, to said signature switching means, and to said ACM, for generating a unique digital signature ($S_j$) based on:
      i. said $F_j$, if said frame switching means is "on";
      ii. said output from said 2:1 MUX, if said signature switching means is "on";
      iii. the status of said enable/disable control signal, wherein said signature generator provides said $S_j$ to said second signature buffer if said enable/disable control signal is set to "enable", said signature generator providing no signature if said enable/disable control signal is set to "disable",
   wherein, if both said frame switching means and said signature switching means are "off", then a "null signature" is generated and said null signature is provided to said second signature buffer if said enable/disable control signal is set to "enable", said signature generator providing no signature if said enable/disable control signal is set to "disable"; and,
   k) an encryptor for receiving said unique digital signature ($S_j$) and for encrypting said unique digital signature if said enable/disable control signal is set to "enable", said signature generator providing no signature to said encryptor if said enable/disable control signal is set to "disable".

2. The two level cross-correlation based system of claim 1 further including a file system for capturing said compressed media frames ($F_j$) from said media encoder wherein said file system provides file system information to said ACM, said ACM providing said reset signal in response to said file system information.

3. The two level cross-correlation based system of claim 1 wherein said uncompressed media data comprises analog data.

4. The two level cross-correlation based system of claim 1 wherein said uncompressed media data comprises digital data.

5. The two level cross-correlation based system of claim 1 wherein said compressed media frames ($F_j$) comprises digital audio/video media data.

6. The two level cross-correlation based system of claim 1 wherein said compressed media frames ($F_j$) comprises digital video media data.

7. The two level cross-correlation based system of claim 1 wherein said compressed media frames ($F_j$) comprises digital audio media data.

8. The two level cross-correlation based system of claim 2 wherein said file system comprises a file system that stores files containing continuous media data.

9. The two level cross-correlation based system of claim 1 wherein said signature generator generates a unique digital signature of a desired length in binary bits based on the desired binary input data.

10. The two level cross-correlation based system of claim 1 wherein said initial signature comprises a binary data of any number of binary bits that is predetermined by the underlying implementation.

11. The two level cross-correlation based system of claim 1 wherein said reset signal provides control to select either said predetermined initial signature ($S_0$) or said previously generated signature ($S_{j-1}$) to participate in the current signature generation process in said signature generator via said signature switching means.

12. The two level cross-correlation based system of claim 1 wherein said encryptor comprises a reversible encryption process/algorithm for encrypting said unique digital signature ($S_j$) and providing said encrypted unique digital signature ($E_j$).

13. A two level cross-correlation based method for watermarking continuous digital media, comprising the steps of:
   a) logically AND'ing a predetermined frame correlation vector (FCV) and a predetermined frame mask vector (FMV) to generate a frame switch vector (FSV);
   b) logically AND'ing a predetermined signature correlation vector (SCV) and a predetermined signature mask vector (SMV) to generate a signature switch vector (SSV);
   c) providing an enable/disable control signal in response to a command by a user via a graphical user interface (GUI);
   d) providing a reset signal,
      wherein said FSV, said SSV, said enable/disable control signal and said reset signal are provided by an application control module (ACM) including said GUI;
   e) receiving uncompressed media data from a media source and providing compressed media frames ($F_j$);

f) retrieving said compressed media frames ($F_j$);

g) buffering a previously generated signature ($S_{j-1}$) utilizing a first signature buffer;

h) buffering a currently generated unique digital signature ($S_j$) utilizing a second signature buffer, wherein a transition from said second signature buffer to said first signature buffer occurs when a transition takes place from one frame to the next;

i) a storing a predefined initial signature ($S_0$) utilizing a third signature buffer;

j) receiving an input from said first signature buffer ($S_{j-1}$), and another input from said third signature buffer ($S_0$) utilizing a 2:1 multiplexer (MUX), said reset signal from said ACM being a select control input signal to said 2:1 MUX, wherein one of the two inputs ($S_{j-1}$) and ($S_0$) are selected as the output from said 2:1 MUX depending on the logic value of said reset signal;

k) generating a unique digital signature ($S_j$) based on:
   i. said $F_j$, if said frame switching means is "on";
   ii. said output from said 2:1 MUX, if said signature switching means is "on";
   iii. the status of said enable/disable control signal, wherein said signature generator provides said $S_j$ to said second signature buffer if said enable/disable control signal is set to "enable", said signature generator providing no signature if said enable/disable control signal is set to "disable", wherein if both said frame switching means and said signature switching means are off, then no signature is generated, wherein, if both said frame switching means and said signature switching means are "off", then a "null signature" is generated and said null signature is provided to said second signature buffer if said enable/disable control signal is set to "enable", said signature generator providing no signature if said enable/disable control signal is set to "disable"; and, l) receiving said unique digital signature ($S_j$) and encrypting said unique digital signature if said enable/disable control signal is set to "enable", said signature generator providing no signature for encryption if said enable/disable control signal is set to "disable".

14. The two level cross-correlation based method of claim 13 further including the step of utilizing a file system to provide file system information to said ACM, said ACM providing said reset signal in response to said file system information.

15. The two level cross-correlation based method of claim 13 wherein said step of generating a unique digital signature comprises generating a unique digital signature of a desired length in binary bits based on the desired binary input data.

16. A two level cross-correlation based system for watermarking continuous digital media, comprising:
   a) means for retrieving at least one signature parameter ($S_j$) determined according to a corresponding previous signature ($S_{j-1}$) or a predefined initial signature ($S_0$); said $S_0$ being selectable by a user command via a reset signal to a multiplexor that selects either $S_0$ or $S_j$ during the course of generating a signature; and,
   b) means for encrypting the present signature according to said at least one signature parameter ($S_j$) to generate a unique digital signature ($E_j$).

* * * * *